(12) United States Patent
Das et al.

(10) Patent No.: US 9,971,963 B1
(45) Date of Patent: May 15, 2018

(54) METHODS, SYSTEMS, AND DEVICES FOR INDIVIDUALIZING N-UP RASTER IMAGES WITH BACKGROUND FORMS

(71) Applicant: XEROX CORPORATION, Norwalk, CT (US)

(72) Inventors: Arindam Das, West Bengal (IN); Ranita Bej, West Bengal (IN); Polisetty Venkata Rama Kota Jyothendra Varma, Andhra Pradesh (IN)

(73) Assignee: XEROX CORPORATION, Norwalk, CT (US)

(*) Notice: Subject to any disclaimer, the term of this patent is extended or adjusted under 35 U.S.C. 154(b) by 0 days. days.

(21) Appl. No.: 15/421,310

(22) Filed: Jan. 31, 2017

(51) Int. Cl.
| | |
|---|---|
| *G06F 15/00* | (2006.01) |
| *G06K 15/00* | (2006.01) |
| *G06K 1/00* | (2006.01) |
| *G06K 15/02* | (2006.01) |
| *G06F 3/12* | (2006.01) |

(52) U.S. Cl.
CPC ......... *G06K 15/189* (2013.01); *G06F 3/1206* (2013.01); *G06F 3/1248* (2013.01); *G06F 3/1252* (2013.01); *G06K 15/1836* (2013.01); *G06K 15/1893* (2013.01)

(58) Field of Classification Search
CPC ............. G06K 15/189; G06K 15/1836; G06K 15/1893; G06F 3/1206; G06F 3/1248; G06F 3/1252

USPC ........................ 358/1.1, 1.15, 1.18, 1.16, 1.9
See application file for complete search history.

(56) References Cited

U.S. PATENT DOCUMENTS

| | | | |
|---|---|---|---|
| 6,205,452 B1 | 3/2001 | Warmus et al. | |
| 7,400,420 B2 | 7/2008 | Kageyama et al. | |
| 8,640,018 B2 * | 1/2014 | Klotz, Jr. ........... | H04N 1/00968 382/203 |
| 2008/0222522 A1 | 9/2008 | Morales | |
| 2012/0036427 A1 | 2/2012 | Osaka et al. | |
| 2013/0304604 A1 * | 11/2013 | Hoffman ............ | G06Q 30/0621 705/26.5 |

* cited by examiner

*Primary Examiner* — Douglas Tran
(74) *Attorney, Agent, or Firm* — MH2 Technology Law Group LLP (57) ABSTRACT

A system, device, and method for printing N-up documents with background forms, by receiving an instruction to print an N-up document, obtaining a document to be printed as the N-up document and a background form, receiving matchings of logical surfaces of the N-up document to the background form, decomposing the logical surfaces of the N-up document into raster images, generating tags, wherein each tag is associated with a pixel of a logical surface of the N-up document and identifies the logical surface, combining raster images of the logical surfaces into an N-up raster image, merging, using the tags, the background form with the N-up raster image to generate a merged N-up raster image, and printing the merged N-up raster image.

18 Claims, 8 Drawing Sheets

METHODS, SYSTEMS, AND DEVICES FOR INDIVIDUALIZING N-UP RASTER IMAGES WITH BACKGROUND FORMS

BACKGROUND

In copying and printing technologies, N-up printing refers to a page layout where multiple pre-rendered pages are composited onto a single page. In N-up printing, "N" refers to the number of "logical pages" composited onto a single page. For example, 2-up printing refers to a page layout where 2 logical pages are composited and printed onto the same page.

Many printing technologies provide for the use of background forms that allow print job data to be merged with premade templates or forms. The result of which can be a printed document that appears as a pre-printed form.

Printing technologies can be improved by methods, systems, and devices that combine the use of background forms with N-up printing.

SUMMARY

The present disclosure relates to systems, devices, and methods for printing N-up documents with background forms by receiving an instruction to print an N-up document, obtaining a document to be printed as the N-up document and a background form, receiving matchings of logical surfaces of the N-up document to the background form, decomposing the logical surfaces of the N-up document into raster images, generating tags, wherein each tag is associated with a pixel of a logical surface of the N-up document and identifies the logical surface, combining raster images of the logical surfaces into an N-up raster image, merging, using the tags, the background form with the N-up raster image to generate a merged N-up raster image, and printing the merged N-up raster image.

In some embodiments, the instruction to print the N-up document can be received from a user using a print dialog.

In other embodiments, the instruction to print the N-up document can be received from a user using a copying function on a multifunction device and selecting an output as N-up.

In further embodiments, the background form is multiple background forms and different background forms of the multiple background forms are matched to different logical surfaces of the N-up document.

In some implementations, the background form can be an N-up background form or a global background form.

In other implementations, the matchings of the logical surfaces of the N-up document to the background form can include a matching of an entire background form to an entire logical surface.

In further implementations, the matchings of the logical surfaces of the N-up document to the background form can include a matching of a section of the background form to an entire logical surface.

In some embodiments, the matchings of the logical surfaces of the N-up document to the background form can include an indication that no background form section is matched to a logical surface.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

In N-up printing, N number of logical surfaces are placed into a single raster image for printing. When background forms are used, they are generally merged with the foreground print job after the foreground print job is placed into the raster image. Thus, merging an N-up print job with one or more background forms into a final raster image generally cannot be performed because there is no identification of which sections of the N-up document are associated with which logical surface in the raster image. Thus, a new raster image fabrication process is needed to allow N-up print jobs to be merged with background forms.

In various embodiments, a Page Description Language (PDL) document and one or more background forms can be merged. During the decomposition of the PDL, each page of the PDL (which is a logical surface of the N-up) can be assigned a tag value based on its location in the N-up. Accordingly, when the logical surfaces are placed into a single raster image, individual sections of the N-up document (e.g., individual pixels) can be associated with the tag value of the corresponding PDL document/logical surface. The tag values can then be used to merge the background forms and the N-up print job into a final raster image. In various embodiments, the final raster image can be printed by a multifunction device.

As used herein, a multifunction device is a device can perform one or more functions, such as printing, photocopying, scanning, faxing, and/or emailing. Additionally, in some embodiments, a multifunction device can also be a computing device that can display options to a user, receive instructions from another computing device or a user, receive print jobs and/or background forms, store print jobs and/or background forms, merge print jobs with background forms, etc.

Figure 1:
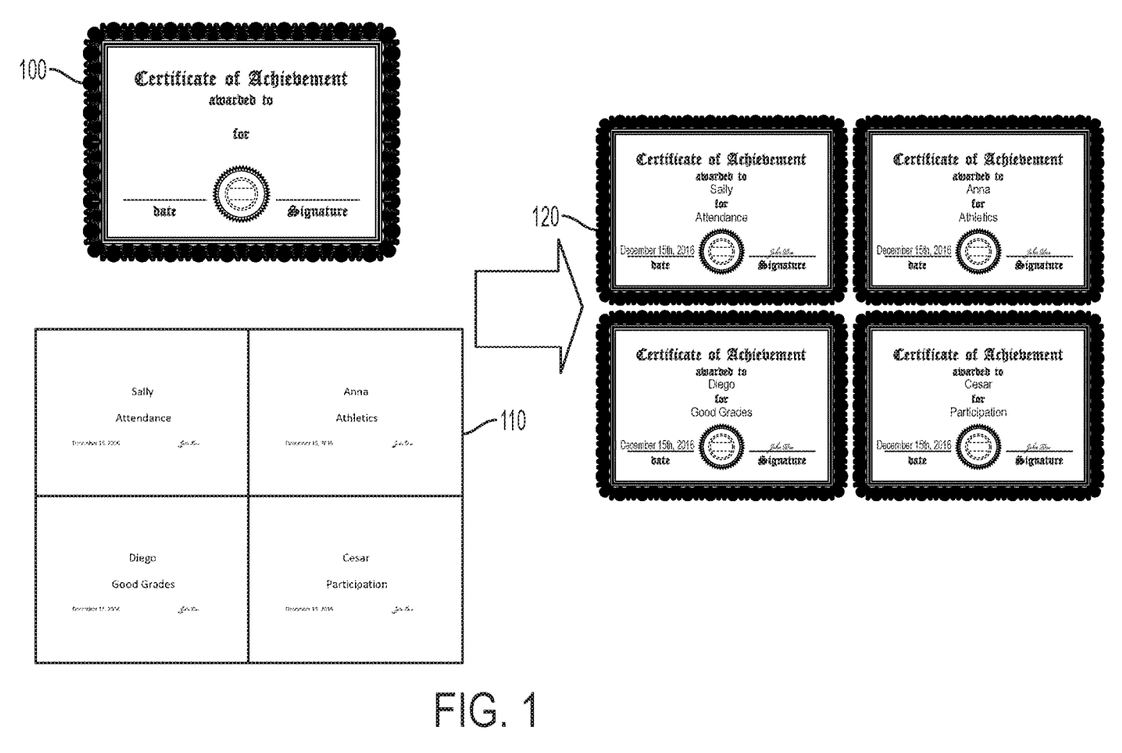
FIG. 1 is a diagram depicting an example combination of one or more background forms with four logical surfaces, consistent with certain disclosed embodiments.

FIG. 1 is a diagram depicting an example combination of one or more background forms with four logical surfaces, consistent with certain disclosed embodiments. FIG. 1 depicts a background form 100, an N-up print job 110, and a printed document 120.

In various embodiments, the background form 100 can represent any type of preexisting document, such as a blank certificate, label, business card, greeting card, binder tab, name tag, sign, brochure, flyer, postcard, report, door hanger, ticket, catalog, poster, envelope, calendar, etc. For example, the background form can be provided by the manufacturer of a multifunction device, the manufacturer of a print server, or a third-party design company. As a further example, the background form can be user-created: by the user of the background form, by another user of a multifunction device or print server, by a user that distributes background forms online, by a company that uses and maintains a multifunction device or print server for use by employees, etc.

In some embodiments, the background form 100 can be a background form that is selected by a user of a multifunction device for merging with a print job. In further embodiments, the user may select multiple background forms for merging with a print job. For example, the user may select N background forms for merging with an N-up print job. Thus, there can be a different background form for each logical surface in the N-up print job.

In some implementations, the N-up print job 110 can represent any type of N-up print job submitted by a user. In some embodiments, the N-up print job can be submitted by selecting an N-up output in a print dialog while running software programs, such as, for example, word processors, document readers, internet browsers, etc. In further embodiments, the N-up print job can be submitted by using the copying function of a multifunction device and selecting the output as N-up.

The N-up print job 110, shown in FIG. 1, is a 4-up print job, and, thus, includes four logical surfaces. However, other values of N can be used in various embodiments, such as 2, 3, 6, 8, 10, etc.

In some embodiments, each logical surface can be created separately by a user. For example, each logical surface can represent a page in a word processing document, a page of a Portable Document Format (PDF) file, a page of a PostScript (PS) file, a viewing area of a web page, etc. In further embodiments, each logical surface can represent an individual piece of paper that was scanned by a multifunction device for the purpose of using the photocopying function of the multifunction device.

In some implementations, the printed document 120 can represent a single piece of paper that is the printed output of the multifunction device after merging the background form 100 with each logical surface from the N-up print job 110. As shown, each logical surface is individually merged with the background form 100 in the printed document 120, as described in further detail below.

Although, in the example shown in FIG. 1, the same background form is merged with each logical surface, in other embodiments, a different background form can be applied to each logical surface, a background form can be applied to some but not all logical surfaces, multiple background forms can be applied to some but not all logical surfaces, etc.

Figure 2:
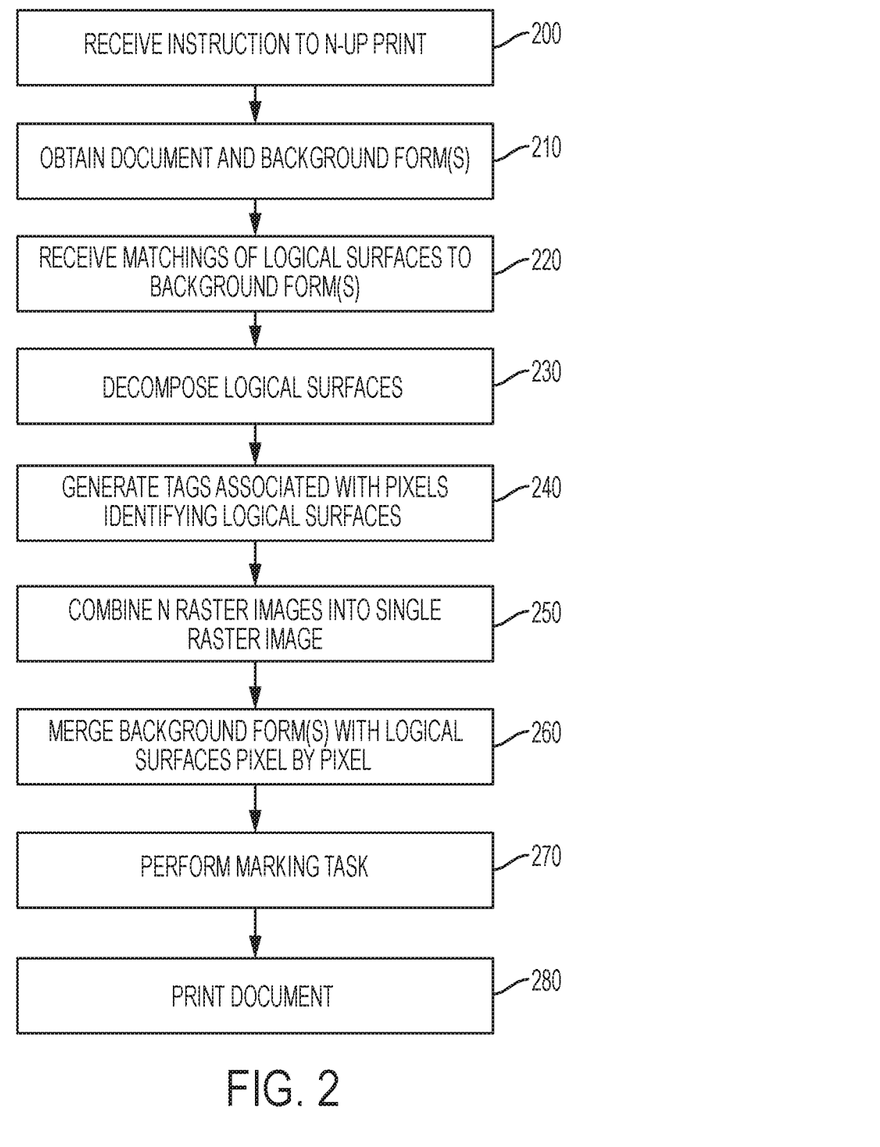
FIG. 2 is a flow diagram depicting an example method for combining one or more background forms with N logical surfaces, consistent with certain disclosed embodiments.

FIG. 2 is a flow diagram depicting an example method for combining one or more background forms with N logical surfaces, consistent with certain disclosed embodiments. The example method can be performed by a computing device. In various embodiments, the computing device can be, a desktop computer, a laptop, a smart phone or other type of smart device, a tablet computer, a print server or other type of server, a multifunction device, etc.

The process can begin in 200 when the computing device receives an instruction to print an N-up document. In some embodiments, the instruction can be received via a print dialog initiated by a user via a software program, such as, for example, a word processor, a document reader, an internet browser, etc. In further embodiments, the instruction can be received from a user selecting a copying function on a multifunction device and selecting the output as N-up. In still further embodiments, the instruction can be received from a print server via an automated process, via instructions from a user, from a print process submitted to the print server by another device, etc.

In 210, the computing device can obtain the document to be printed and the background form(s) to be merged with the document. In some embodiments, the document to be printed can be a document stored on the computing device and/or a document that is open in a word processor, document reader, internet browser, etc. Accordingly, in further embodiments, the computing device can obtain the document prior to receiving the instruction to print the document as an N-up document in 200, and, in other embodiments, the computing device can obtain the document with the instruction to print the document in 200.

In further embodiments, the document to be printed can be obtained from, for example, another computing device (e.g., a personal computer of a user, a print server, etc.) or the document can be received from a user scanning the document via a multifunction device.

In various embodiments, the document to be printed can be obtained as a word processing document, a PDF file, a PS file, a Hypertext Markup Language (HTML) file, a PDL document, etc.

In some implementations, the background form can be already decomposed raster format data stored on the computing device. Accordingly, in some embodiments, the computing device can obtain the background form prior to receiving the instruction to print the N-up document in 200, and, in other embodiments, the computing device can obtain the background form with the instruction to print the document in 200.

In further implementations, the background form can be obtained from, for example, another computing device (e.g., a personal computer of a user, a print server, etc.).

In some embodiments, the background form can be selected by a user via, for example, a print dialog or via a display screen of a multifunction device. In further embodiments, the background form can be multiple background forms.

In 220, the computing device can receive matchings of logical surfaces of the N-up document to background form (s). For example, a user can select to use the same background form for all logical surfaces, a user can select to use the same background form for some but not all of the logical surfaces, a user can select which background form of multiple background forms to apply to which logical surface or to apply no background form to a logical surface, etc.

In some implementations, a user may be instructed to select a background form with the same resolution as corresponding logical surface. Thus, if the user selects a background form that is not the same resolution, an error message may be displayed and the user may be instructed to select a different background form. In further implementations, a user selected background form can be scaled to the resolution of the logical surface if the resolutions are not the same.

In some embodiments, the computing device can display a rendering of the background form(s) and the N-up document to allow the user to select which background form to combine with which logical surface, and, in further embodiments, the computing device can display a merged rendering of the selected background form with the selected logical surface.

In 230, the logical surfaces can be decomposed.

In some embodiments, the decomposition process can include converting each page of the document to be printed into a raster image. As used herein, a raster image can be a data structure that represents a 2-dimensional array. The array can correspond to a rectangular grid of pixels or other points of color and can include color values for individual elements in the array.

In further embodiments, the decomposition process can also include converting the background form(s) into a raster image.

In other embodiments, the background form(s) may have previously been decomposed into a raster image. For example, the background form(s) may have originally been a PDF file, a PS file, an HTML file, a PDL document, etc. that were submitted to a print server. The print server may have decomposed the original file or document into a raster image, and the computing device may have the raster image storage locally or accessible via a network connection.

In 240, a tag for pixels (e.g., elements in the 2-dimensional array) in the raster image for the logical surfaces associated with a background form can be generated. In some embodiments, the tag can be an 8-bit tag that includes a value that identifies the corresponding logical surface. For example, in a 4-up document the tags 11, 12, 21, and 22 can be used with the first position representing the column number of the logical surface in the N-up document and the second position representing the row number of the logical surface in the N-up document.

In various embodiments, if a logical surface is not associated with a background form then no tag may be assigned, a tag may be assigned with a null value, a tag may be assigned with a value that indicates no background form is associated with the logical surface, etc.

In 250, the raster images for N logical surfaces can be combined into a single raster image and the single raster image can include color values and the tag for each pixel in the image.

In 260, the single raster image with multiple logical surfaces can be combined with the raster image for the background form(s). For example, if a background form is assigned to the logical surface 11, then the pixels in the N-up raster image that include the tag with the value 11 can be merged with the raster image for that background form.

In some embodiments, each pixel of the N-up raster image can be merged with one or more pixels in the background form into a merged raster image. For example, the pixel in the first column and first row of the N-up raster image can be associated with a tag indicating that the pixel is associated with the logical surface in the first column and first row of an N-up document (logical surface 11). Accordingly, that pixel can be merged with the first two pixels in the first row and the first two pixels in the second row of the raster image for the background form assigned to the first logical surface. Thus, the one pixel of the N-up raster image can be merged with four pixels of the background form raster image to properly scale the background form to the logical surface.

In various embodiments, the pixels can be merged by, for example, replacing values in the background form raster image pixels with values from the corresponding N-up raster image if the value in the corresponding N-up raster image represents a color (e.g., a non-zero value), and maintaining the values in the background form raster image pixels if the corresponding N-up raster image value represents no color (e.g., a zero value).

In further embodiments, if no tag is associated with a pixel, a tag indicates that no background form is associated with the corresponding logical surface, etc., then no merging process may be performed on that pixel.

In 270, the computing device can perform a marking task on the merged raster image to, for example, mark objects in the merged raster image based on type (e.g., images, text, or graphics).

In various embodiments, 230-270 can be repeated for each page of the N-up document. For example, if the document to be printed is initially 16 pages and is printed as a 4-up document, then 230-270 can be performed four times, which each page of the N-up document representing 4 pages of the document to be printed.

In 280, the document can be printed by a multifunction device. For example, the computing device can be the multifunction device or the computing device can transfer the final raster images to a multifunction device.

In further embodiments, 280 can be performed for each page of the N-up document after the marking task is performed in 270. Thus, in such embodiments, 230-280 can be repeated for each page of the N-up document.

While the steps depicted in FIG. 2 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 3:
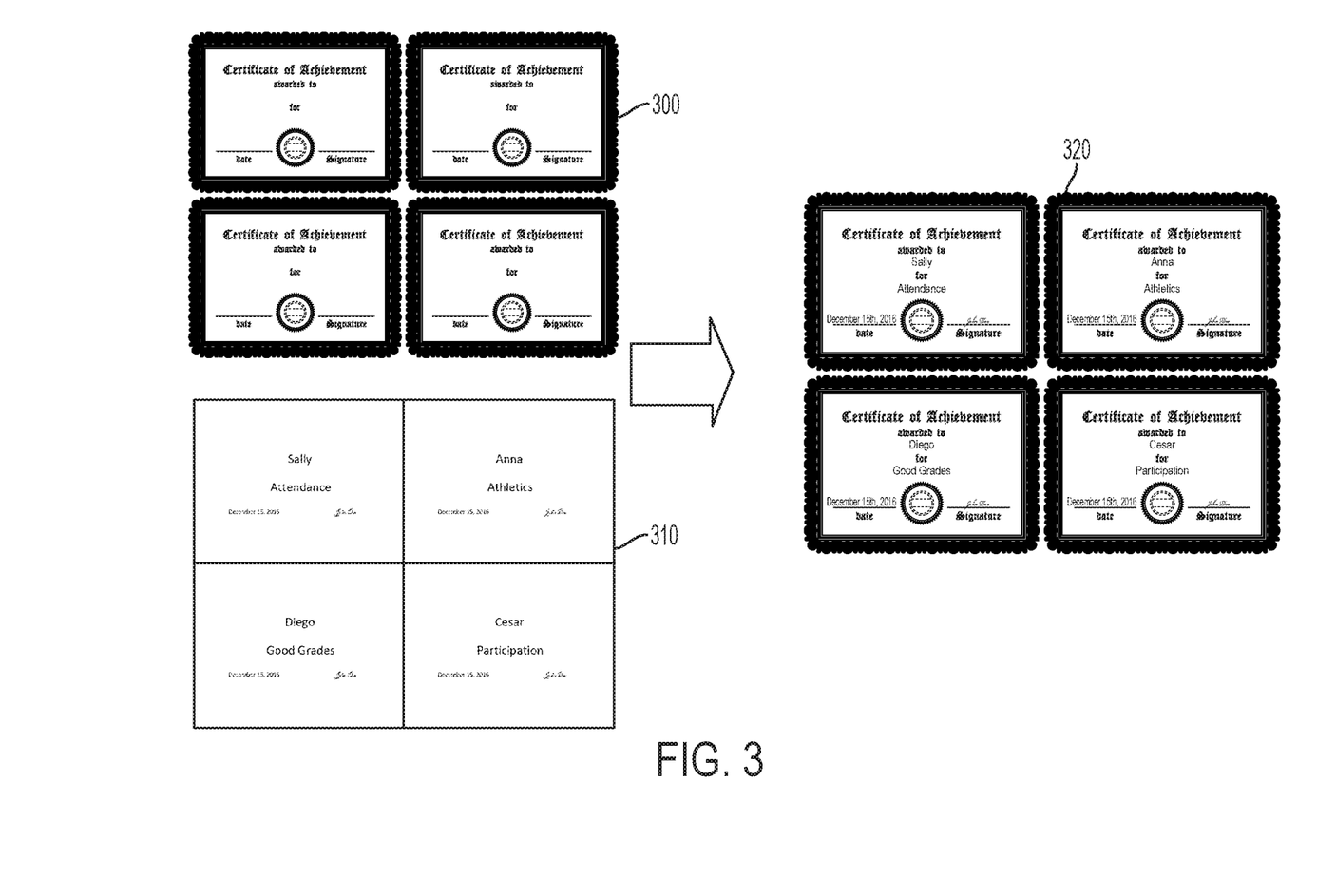
FIG. 3 is a diagram depicting an example combination of an N-up background form with four logical surfaces, consistent with certain disclosed embodiments.

FIG. 3 is a diagram depicting an example combination of an N-up background form with four logical surfaces, consistent with certain disclosed embodiments. FIG. 3 depicts an N-up background form 300, an N-up print job 310, and a printed document 320.

In various embodiments, the N-up background form 300 can represent any type of preexisting document, as described above regarding the background form 100 in FIG. 1. However, the N-up background form 300 can be specifically designed for N-up printing and, accordingly, can be visually split into N separate parts. The N separate parts can, in some embodiments, be identical (as shown in FIG. 3), while, in further embodiments, the separate parts can be different designs.

In some embodiments, the N-up background form 300 can be a background form that is selected by a user of a multifunction device for merging with a print job.

In some implementations, the N-up print job 310 can represent any type of N-up print job submitted by a user. In some embodiments, the N-up print job can be submitted by selecting an N-up output in a print dialog, as described above. In further embodiments, the N-up print job can be submitted by using the copying function of a multifunction device and selecting the output as N-up.

The N-up print job 310, shown in FIG. 3 is a 4-up print job, and, thus, includes four logical surfaces. However, other values of N can be used in various embodiments, such as 2, 3, 6, 8, 10, etc.

In some embodiments, each logical surface can be created separately by a user. In further embodiments, each logical surface can represent an individual piece of paper that was scanned by a multifunction device for the purpose of using the photocopying function of the multifunction device.

In some implementations, the printed document 320 can represent a single piece of paper that is the printed output of the multifunction device after merging the N-up background form 300 with each logical surface from the N-up print job 310. As shown, each logical surface is individually merged with the N-up background form 300 in the printed document 320, as described in further detail below.

Although, in the example shown in FIG. 3, the appropriate section of the N-up background form is merged with each corresponding logical surface, in other embodiments, some but not all of the logical surfaces may be merged. Thus, even though the N-up background form 300 has N sections, not every section may be included in the printed document 320.

Figure 4:
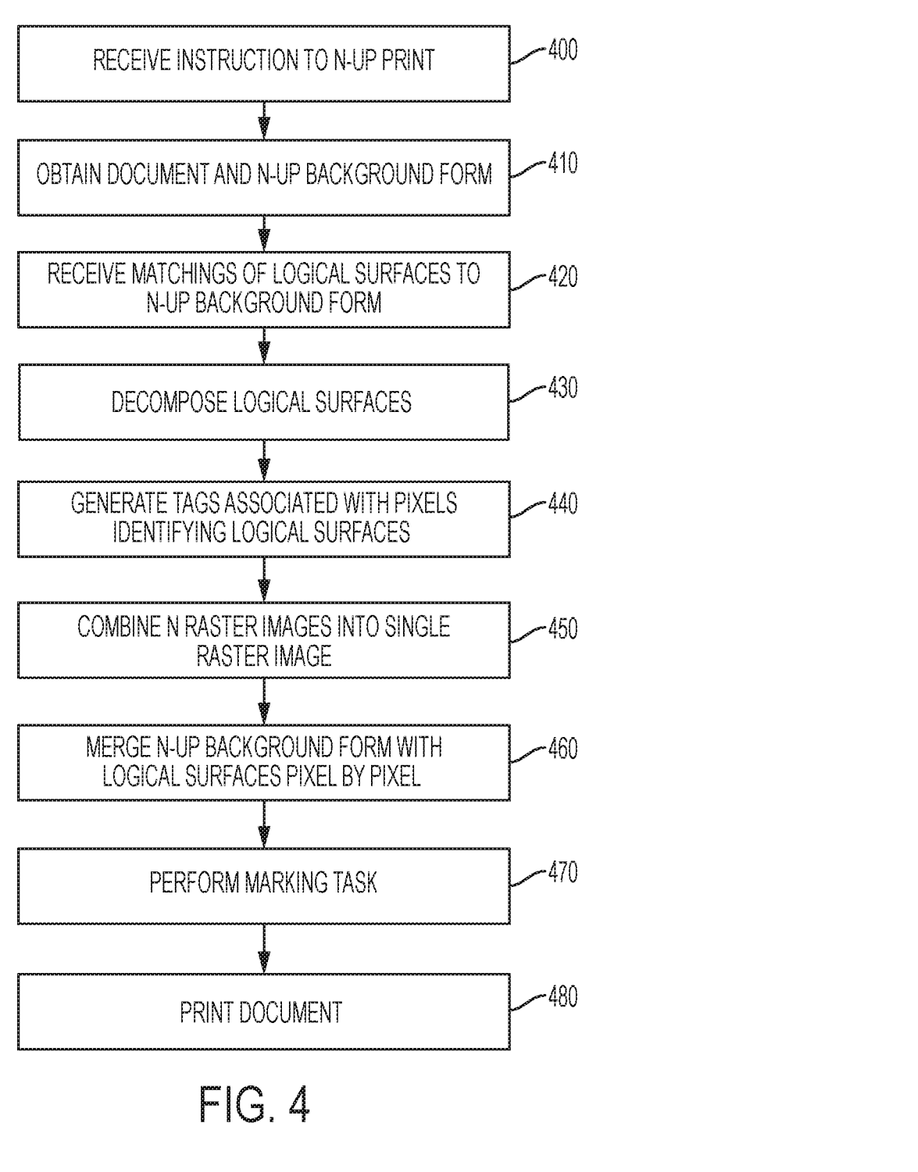
FIG. 4 is a flow diagram depicting an example method for combining an N-up background form with N logical surfaces, consistent with certain disclosed embodiments.

FIG. 4 is a flow diagram depicting an example method for combining an N-up background form with N logical surfaces, consistent with certain disclosed embodiments. The example method can be performed by a computing device. In various embodiments, the computing device can be, a desktop computer, a laptop, a smart phone or other type of smart device, a tablet computer, a print server or other type of server, a multifunction device, a standalone printer, etc.

The process can begin in 400 when the computing device receives an instruction to print an N-up document. In some embodiments, the instruction can be received via a print dialog initiated by a user via a software program. In further embodiments, the instruction can be received from a user selecting a copying function on a multifunction device and selecting the output as N-up. In still further embodiments, the instruction can be received from a print server via an automated process, via instructions from a user, from a print process submitted to the print server by another device, etc.

In 410, the computing device can obtain the document to be printed and an N-up background form to be merged with the document. In some embodiments, the document to be printed can be a document stored on the computing device and/or a document that is open in a word processor, document reader, interne browser, etc. Accordingly, in some embodiments, the computing device can obtain the document prior to receiving the instruction to print the document as an N-up document in 400, and, in other embodiments, the computing device can obtain the document with the instruction to print the document in 400.

In further embodiments, the document to be printed can be obtained from, for example, another computing device (e.g., a personal computer of a user, a print server, etc.) or the document can be received from a user scanning the document via a multifunction device.

In various embodiments, the document to be printed can be obtained as a word processing document, a PDF file, a PS file, an HTML file, a PDL document, etc.

In some implementations, the N-up background form can be already decomposed raster format data stored on the computing device. Accordingly, in some embodiments, the computing device can obtain the N-up background form prior to receiving the instruction to print the N-up document in 400, and, in other embodiments, the computing device can obtain the N-up background form with the instruction to print the document in 400.

In further implementations, the N-up background form can be obtained from, for example, another computing device (e.g., a personal computer of a user, a print server, etc.).

In some embodiments, the N-up background form can be selected by a user via, for example, a print dialog or via a display screen of a multifunction device.

In 420, the computing device can receive matchings of logical surfaces of the N-up document to the N-up background form. For example, a user can select to not use one section of the N-up background form (i.e., just print the associated logical surface without merging with a background) and to use another section of the N-up background form (i.e., to merge that section of the N-up background form with the logical surface), etc.

In some implementations, a user may be instructed to select a N-up background form with the same resolution as corresponding N-up print job. Thus, if the user selects a N-up background form that is not the same resolution, an error message may be displayed and the user may be instructed to select a different N-up background form. In further implementations, a user selected N-up background form can be scaled to the resolution of the N-up print job if the resolutions are not the same.

In some embodiments, the computing device can display a rendering of the N-up background form and the N-up document to allow the user to select which N-up background form to combine with which N-up document, and, in further embodiments, the computing device can display a merged rendering of the selected N-up background form with the N-up document.

In 430, the logical surfaces can be decomposed.

In some embodiments, the decomposition process can include converting each page of the document to be printed into a raster image.

In further embodiments, the decomposition process can also include converting the N-up background form into a raster image.

In other embodiments, the N-up background form may have previously been decomposed into a raster image.

In 440, a tag for pixels (e.g., elements in the 2-dimensional array) in the raster image for the logical surfaces associated with the N-up background form can be generated. In some embodiments, the tag can be an 8-bit tag that includes a value that identifies the corresponding logical surface.

In various embodiments, if a logical surface is not associated with a section of the N-up background form then no tag may be assigned, a tag may be assigned with a null value, a tag may be assigned value that indicates no section of the N-up background form is associated with the logical surface, etc.

In 450, the raster images for the N logical surfaces can be combined into a single raster image and the single raster image can include color values and the tag for each pixel in the image.

In 460, the single raster image with multiple logical surfaces can be combined with the raster image for the N-up background form. For example, if the logical surface 11 is associated with the N-up background form, then the pixels in the N-up raster image that include the tag with the value 11 can be merged with the raster image for the N-up background form.

In some embodiments, pixels of the N-up raster image can be merged with each pixel in the N-up background form into a merged raster image. For example, the pixel in the first column and first row of the N-up raster image can be associated with a tag indicating that the pixel is associated with the logical surface in the first column and first row of an N-up document (logical surface 11). Accordingly, that pixel can be merged with the pixel in the first row and the first column of the raster image for the N-up background form.

In further embodiments, if no tag is associated with a pixel, a tag indicates that no background form is associated with the corresponding logical surface, etc., then no merging process may be performed on that pixel.

In 470, the computing device can perform a marking task on the merged raster image to, for example, mark objects in the merged raster image based on type (e.g., images, text, or graphics).

In various embodiments, 430-470 can be repeated for each page of the N-up document.

In 480, the document can be printed by a multifunction device. For example, the computing device can be the multifunction device or the computing device can transfer the final raster images to a multifunction device.

In further embodiments, 480 can be performed for each page of the N-up document after the marking task is performed in 470. Thus, in such embodiments, 430-480 can be repeated for each page of the N-up document.

While the steps depicted in FIG. 4 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 5:
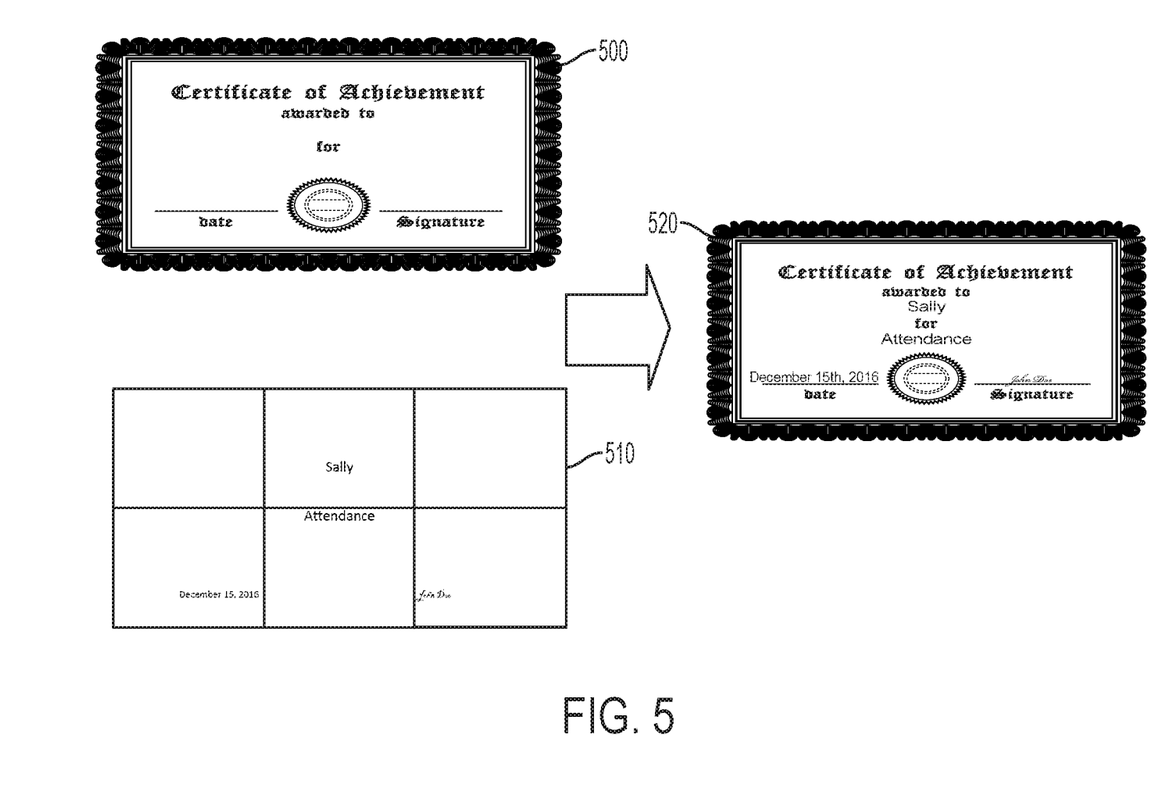
FIG. 5 is a diagram depicting an example combination of a global background form with four logical surfaces, consistent with certain disclosed embodiments.

FIG. 5 is a diagram depicting an example combination of a global background form with four logical surfaces, consistent with certain disclosed embodiments. FIG. 5 depicts a global background form 500, an N-up print job 510, and a printed document 520.

In various embodiments, the global background form 500 can represent any type of preexisting document, as described above regarding the background form 100 in FIG. 1 or the N-up background form 300 in FIG. 3. However, the global background form 500 may a single continuous design.

In some embodiments, the global background form 500 can be a background form that is selected by a user of a multifunction device for merging with a print job.

In some implementations, the N-up print job 510 can represent any type of N-up print job submitted by a user. In some embodiments, the N-up print job can be submitted by selecting an N-up output in a print dialog, as described above. In further embodiments, the N-up print job can be submitted by using the copying function of a multifunction device and selecting the output as N-up.

The N-up print job 510, shown in FIG. 5, is a 2X3 print job (i.e., a 6-up print job), and, thus, includes six logical surfaces. However, other values of N can be used in various embodiments, such as 2, 3, 4, 8, 10, etc.

In some embodiments, each logical surface can be created separately by a user. In further embodiments, each logical surface can represent an individual piece of paper that was scanned by a multifunction device for the purpose of using the photocopying function of the multifunction device.

In some implementations, the printed document 620 can represent a single piece of paper that is the printed output of the multifunction device after merging the global background form 600 with each logical surface from the N-up print job 610. As shown, each logical surface is individually merged with the global background form 500 in the printed document 520, as described in further detail below.

Although, in the example shown in FIG. 5, the appropriate section of the global background form is merged with each the corresponding logical surface, in other embodiments, some, but not all of the logical surfaces may be merged. Thus, even though the global background form 500 has N sections, not every section may be included in the printed document 520.

Figure 6:
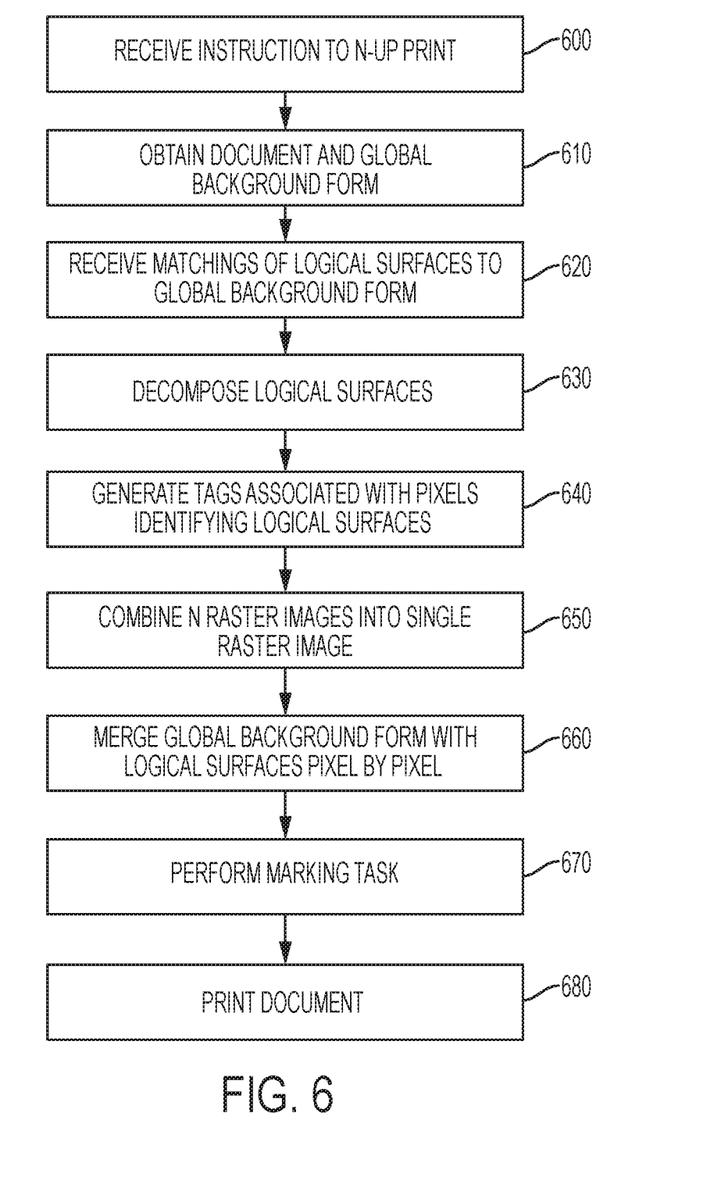
FIG. 6 is a flow diagram depicting an example method for combining a global background form with N logical surfaces, consistent with certain disclosed embodiments.

FIG. 6 is a flow diagram depicting an example method for combining a global background form with N logical surfaces, consistent with certain disclosed embodiments. The example method can be performed by a computing device. In various embodiments, the computing device can be, a desktop computer, a laptop, a smart phone or other type of smart device, a tablet computer, a print server or other type of server, a multifunction device, a standalone printer, etc.

The process can begin in 600 when the computing device receives an instruction to print an N-up document. In some embodiments, the instruction can be received via a print dialog initiated by a user via a software program. In further embodiments, the instruction can be received from a user selecting a copying function on a multifunction device and selecting the output as N-up. In still further embodiments, the instruction can be received from a print server via an automated process, via instructions from a user, from a print process submitted to the print server by another device, etc.

In 610, the computing device can obtain the document to be printed and a global background form to be merged with the document. In some embodiments, the document to be printed can be a document stored on the computing device and/or a document that is open in a word processor, document reader, interne browser, etc. Accordingly, in some embodiments, the computing device can obtain the document prior to receiving the instruction to print the document as an N-up document in 600, and, in other embodiments, the computing device can obtain the document with the instruction to print the document in 600.

In further embodiments, the document to be printed can be obtained from, for example, another computing device (e.g., a personal computer of a user, a print server, etc.) or the document can be received from a user scanning the document via a multifunction device.

In various embodiments, the document to be printed can be obtained as a word processing document, a PDF file, a PS file, an HTML file, a PDL document, etc.

In some implementations, the global background form can be already decomposed raster format data stored on the computing device. Accordingly, in some embodiments, the computing device can obtain the global background form prior to receiving the instruction to print the N-up document in 600, and, in other embodiments, the computing device can obtain the global background form with the instruction to print the document in 600.

In further implementations, the global background form can be obtained from, for example, another computing device (e.g., a personal computer of a user, a print server, etc.).

In some embodiments, the global background form can be selected by a user via, for example, a print dialog or via a display screen of a multifunction device.

In 620, the computing device can receive matchings of logical surfaces of the N-up document to the global background form. For example, a user can select to not use one section of the global background form (i.e., just print the associated logical surface without merging with a background) and to use another section of the global background form (i.e., to merge that section of the N-up background form with the logical surface), etc.

In some implementations, a user may be instructed to select a global background form with the same resolution as corresponding N-up print job. Thus, if the user selects a global background form that is not the same resolution, an error message may be displayed and the user may be instructed to select a different global background form. In further implementations, a user selected global background form can be scaled to the resolution of the N-up print job if the resolutions are not the same.

In some embodiments, the computing device can display a rendering of the global background form and the N-up document to allow the user to select which global background form to combine with which N-up document, and, in further embodiments, the computing device can display a merged rendering of the selected global background form with the N-up document.

In 630, the logical surfaces can be decomposed.

In some embodiments, the decomposition process can include converting each page of the document to be printed into a raster image.

In further embodiments, the decomposition process can also include converting the global background form into a raster image.

In other embodiments, the global background form may have previously been decomposed into a raster image.

In 640, a tag for pixels (e.g., elements in the 2-dimensional array) in the raster image for the logical surfaces associated with the global background form can be generated. In some embodiments, the tag can be an 8-bit tag that includes a value that identifies the corresponding logical surface.

In various embodiments, if a logical surface is not associated with a section of the global background form then no tag may be assigned, a tag may be assigned with a null value, a tag may be assigned a value that indicates no section of the global background form is associated with the logical surface, etc.

In 650, the raster images for N logical surfaces can be combined into a single raster image and the single raster image can include color values and the tag for each pixel in the image.

In 660, the single raster image with multiple logical surfaces can be combined with the raster image for the global background form. For example, if the logical surface 11 is associated with the global background form, then the pixels in the N-up raster image that include the tag with the value 11 can be merged with the raster image for the global background form.

In some embodiments, pixels of the global raster image can be merged with each pixel in the global background form into a merged raster image. For example, the pixel in the first column and first row of the N-up raster image can be associated with a tag indicating that the pixel is associated with the logical surface in the first column and first row of an N-up document (logical surface 11). Accordingly, that pixel can be merged with the pixel in the first row and the first column of the raster image for the global background form.

In further embodiments, if no tag is associated with a pixel, a tag indicates that no background form is associated with the corresponding logical surface, etc., then no merging process may be performed on that pixel.

In 670, the computing device can perform a marking task on the merged raster image to, for example, mark objects in the merged raster image based on type (e.g., images, text, or graphics).

In various embodiments, 630-670 can be repeated for each page of the N-up document.

In 680, the document can be printed by a multifunction device. For example, the computing device can be the multifunction device or the computing device can transfer the final raster images to a multifunction device.

In further embodiments, 680 can be performed for each page of the N-up document after the marking task is performed in 670. Thus, in such embodiments, 630-680 can be repeated for each page of the N-up document.

While the steps depicted in FIG. 6 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 7:
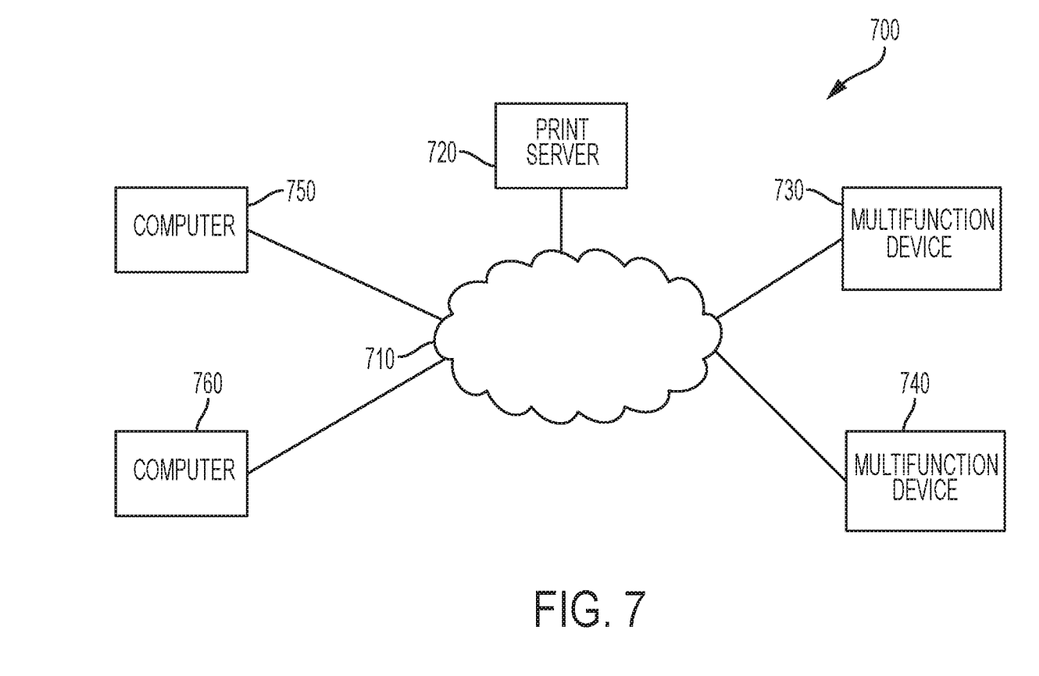
FIG. 7 is a diagram illustrating an example network environment for printing and/or copying, consistent with certain disclosed embodiments.

FIG. 7 is a diagram illustrating an example network environment for printing and/or copying, consistent with certain disclosed embodiments. In some embodiments, the environment 700 can include a network 710, a print server 720, a multifunction device 730, a multifunction device 740, a computer 750, and a computer 760.

In some embodiments, the network 710 can represent any type of one or more wired and/or wireless telecommunications networks. For example, the network 710 can represent the Internet, one or more telephone networks, one or more cellular data networks, one or more local area networks (LANs), etc. In some implementations, computing devices, such as, for example, the computer 750 or the computer 760, can connect to, for example, the print server 720, the multifunction device 730, and/or the multifunction device 740 via the network 710.

In some embodiments, the print server 720 can represent one or more computing devices. For example, the print server 720 can represent one or more print servers, database servers, web servers, mainframe computers, routers, etc.

As used herein, a print server (e.g., the print server 720) can represent any device that can facilitate network printing by, for example, connecting multifunction devices (e.g., the multifunction device 730 or the multifunction device 740) to client computers (e.g., the computer 750 or the computer 760) via a network (e.g., the network 710). The print server 720, can also store background forms, queue print jobs locally, inspect jobs in the queue, reorder or delete print jobs, perform accounting tasks, etc.

In some implementations, the multifunction device 730 and the multifunction device 740 can each represent one or more devices that can perform one or more functions, such as printing, photocopying, scanning, faxing, emailing, etc. In some embodiments, the multifunction device 730 and/or the multifunction device 740 can receive print jobs from the print server 720, the computer 750, and/or the computer 760. In further embodiments, the multifunction device 730 and/or the multifunction device 740 can include a display and input interface for receiving instructions from a user, displaying renderings of print jobs, displaying background forms, etc.

In some embodiments, the computer 750 and the computer 760 can each represent one or more end-user computing devices, such as, for example, desktop computers, laptops, mobile devices, smart devices, etc. The computer 750 and/or the computer 760 can be connected to the network 710 and can communicate with the print server 720, the multifunction device 730, and/or the multifunction device 740.

The schematic depicted in FIG. 7 is merely for the purpose of illustration and is not intended to be limiting. Further, the network environment depicted is merely a simplified example, consistent with certain disclosed embodiments, but such an example is not intended to be limiting. For example, in various embodiments, the network environment can include additional networks, servers, computers, storage devices, printers, multifunction devices, and/or other devices. Additionally, the described devices can be separate devices, as pictured, or various devices can be combined, consistent with certain disclosed embodiments.

Figure 8:
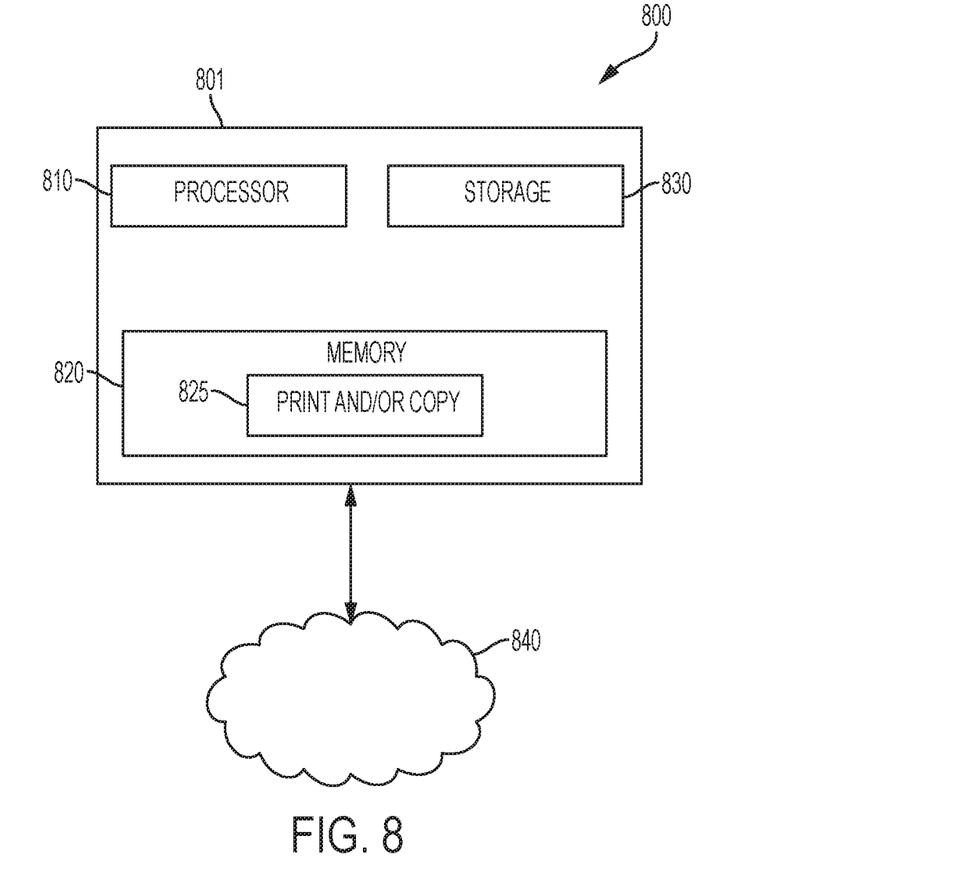
FIG. 8 is a diagram illustrating an example of a hardware system for printing and/or copying, consistent with certain disclosed embodiments.

FIG. 8 is a diagram illustrating an example of a hardware system for printing and/or copying, consistent with certain disclosed embodiments. An example hardware system 800 includes example system components that may be used. The components and arrangement, however, may be varied.

A computer 801 may include a processor 810, a memory 820, a storage 830, and input/output (I/O) devices (not pictured). The computer 801 may be implemented in various ways and can be configured to perform any of the embodiments described above. In some embodiments, the computer 801 can be a computer of an end-user such as, for example, a desktop computer, a laptop, a mobile device, a smart device, a tablet computer, etc. In other embodiments, the computer 801 can be a computing device such as, for example, a print server, a database server, a web server, a mainframe computer, etc. In further embodiments, the computer 801 can be multifunction device that can perform one or more of printing, photocopying, scanning, faxing, emailing, etc. For example, the computer 801 can be the print server 720, the multifunction device 730, the multifunction device 740, the computer 750, or the computer 760, shown in FIG. 7. The computer 801 may be standalone or may be part of a subsystem, which may, in turn, be part of a larger system.

The processor 810 may include one or more known processing devices, such as a microprocessor from the Intel Core™ family manufactured by Intel™, the Phenom™ family manufactured by AMD™, or the like. The memory 820 may include one or more storage devices configured to store information and/or instructions used by the processor 810 to perform certain functions and operations related to the disclosed embodiments. The storage 830 may include a volatile or non-volatile, magnetic, semiconductor, tape, optical, removable, non-removable, or other type of computer-readable medium used as a storage device. In some embodiments, the storage 830 can include, for example, domain name records or other resources, contextual information, contextual rules, and resolution rules, etc.

In an embodiment, the memory 820 may include one or more programs or subprograms including instructions that may be loaded from the storage 830 or elsewhere that, when executed by computer 801, perform various procedures, operations, or processes consistent with disclosed embodiments. For example, the memory 820 may include a print and/or copy program 825 for processing printing jobs and/or performing copying functions, according to various disclosed embodiments. The memory 820 may also include other programs that perform other functions, operations, and processes, such as programs that provide communication support, Internet access, etc. The print and/or copy program 825 may be embodied as a single program, or alternatively, may include multiple sub-programs that, when executed, operate together to perform the function of the print and/or copy program 825 according to disclosed embodiments. In some embodiments, the print and/or copy program 825 can perform all or part of the processes of FIGS. 2, 4, and 6, described above.

The computer 801 may communicate over a link with the network 840. For example, the link may be a direct communication link, a local area network (LAN), a wide area network (WAN), or other suitable connection. The network 840 may include the internet, as well as other networks, which may be connected to various systems and devices.

The computer 801 may include one or more input/output (I/O) devices (not pictured) that allow data to be received and/or transmitted by the computer 801. I/O devices may also include one or more digital and/or analog communication I/O devices that allow the computer 801 to communicate with other machines and devices. I/O devices may also include input devices such as a keyboard or a mouse, and may include output devices such as a display or a printer. The computer 801 may receive data from external machines and devices and output data to external machines and devices via I/O devices. The configuration and number of input and/or output devices incorporated in I/O devices may vary as appropriate for various embodiments.

Example uses of the system 800 can be described by way of example with reference to the embodiments described above.

While the teachings have been described with reference to the example embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
   a processing system comprising one or more processors; and
   a memory system comprising one or more computer-readable media, wherein the one or more computer-readable media contain instructions that, when executed by the processing system, cause the processing system to perform operations comprising:
   receiving an instruction to print an N-up document;
   obtaining a document to be printed as the N-up document and a background form;
   receiving matchings of logical surfaces of the N-up document to the background form;
   decomposing the logical surfaces of the N-up document into raster images;
   generating a plurality of tags, wherein each tag is associated with a pixel of a logical surface of the N-up document and identifies the logical surface;
   combining raster images of the logical surfaces into an N-up raster image;

merging, using the plurality of tags, the background form with the N-up raster image to generate a merged N-up raster image; and printing the merged N-up raster image.

2. The system of claim 1, wherein the instruction to print the N-up document is received from a user using a print dialog.

3. The system of claim 1, wherein the instruction to print the N-up document is received from a user using a copying function on a multifunction device and selecting an output as N-up.

4. The system of claim 1, wherein the background form is a plurality of background forms and different background forms of the plurality of background forms are matched to different logical surfaces of the N-up document.

5. The system of claim 1, wherein the background form is an N-up background form.

6. The system of claim 1, wherein the background form is a global background form.

7. The system of claim 1, wherein the matchings of the logical surfaces of the N-up document to the background form comprises a matching of an entire background form to an entire logical surface.

8. The system of claim 1, wherein the matchings of the logical surfaces of the N-up document to the background form comprises a matching of a section of the background form to an entire logical surface.

9. The system of claim 1, wherein the matchings of the logical surfaces of the N-up document to the background form comprises an indication that no background form section is matched to a logical surface.

10. A non-transitory computer readable storage medium comprising instructions for causing one or more processors to receiving an instruction to print an N-up document;

obtaining a document to be printed as the N-up document and a background form;

receiving matchings of logical surfaces of the N-up document to the background form;

decomposing the logical surfaces of the N-up document into raster images;

generating a plurality of tags, wherein each tag is associated with a pixel of a logical surface of the N-up document and identifies the logical surface;

combining raster images of the logical surfaces into an N-up raster image;

merging, using the plurality of tags, the background form with the N-up raster image to generate a merged N-up raster image; and printing the merged N-up raster image.

11. The non-transitory computer readable medium of claim 10, wherein the background form is a plurality of background forms and different background forms of the plurality of background forms are matched to different logical surfaces of the N-up document.

12. The non-transitory computer readable of claim 10, wherein the instruction to print the N-up document is received from a user using a print dialog.

13. The non-transitory computer readable of claim 10, wherein the instruction to print the N-up document is received from a user using a copying function on a multifunction device and selecting an output as N-up.

14. The non-transitory computer readable of claim 10, wherein the background form is an N-up background form.

15. The non-transitory computer readable of claim 10, wherein the background form is a global background form.

16. The non-transitory computer readable of claim 10, wherein the matchings of the logical surfaces of the N-up document to the background form comprises a matching of an entire background form to an entire logical surface.

17. The non-transitory computer readable of claim 10, wherein the matchings of the logical surfaces of the N-up document to the background form comprises a matching of a section of the background form to an entire logical surface.

18. The non-transitory computer readable of claim 10, wherein the matchings of the logical surfaces of the N-up document to the background form comprises an indication that no background form section is matched to a logical surface.

\* \* \* \* \*